(12) United States Patent
Burris et al.

(10) Patent No.: US 7,047,668 B2
(45) Date of Patent: May 23, 2006

(54) ARTICLE OF FOOTWEAR HAVING AN UPPER WITH A POLYMER LAYER

(75) Inventors: Dan Burris, North Plains, OR (US); Tobie D. Hatfield, Lake Oswego, OR (US)

(73) Assignee: Nike, Inc., Beaverton, OR (US)

( * ) Notice: Subject to any disclaimer, the term of this patent is extended or adjusted under 35 U.S.C. 154(b) by 53 days.

(21) Appl. No.: 10/625,848

(22) Filed: Jul. 24, 2003

(65) Prior Publication Data

US 2005/0016023 A1  Jan. 27, 2005

(51) Int. Cl.
*A43B 7/06* (2006.01)
*A43B 5/00* (2006.01)

(52) U.S. Cl. ............................... 36/3 A; 36/45; 36/133

(58) Field of Classification Search ................... 36/3 A, 36/45, 3 R, 87, 133
See application file for complete search history.

(56) References Cited

U.S. PATENT DOCUMENTS

| | | | |
|---|---|---|---|
| 2,034,091 A | 3/1936 | Dunbar | |
| 2,147,197 A | 2/1939 | Glidden | |
| 2,622,052 A * | 12/1952 | Chandler | 36/45 |
| 3,525,165 A * | 8/1970 | Randall, Jr. | 36/133 |
| 3,650,051 A * | 3/1972 | Sass | 36/133 |
| 4,232,458 A * | 11/1980 | Bartels | 36/45 |
| 4,281,467 A | 8/1981 | Anderie | |
| 4,447,967 A | 5/1984 | Zaino | |
| 4,693,021 A * | 9/1987 | Mazzarolo | 36/131 |
| 4,785,558 A * | 11/1988 | Shiomura | 36/114 |
| 4,813,158 A | 3/1989 | Brown | |
| 4,858,339 A | 8/1989 | Hayafuchi et al. | |
| 5,216,827 A | 6/1993 | Cohen | |
| 5,389,176 A | 2/1995 | Nakanishi et al. | |
| 5,437,112 A * | 8/1995 | Johnston | 36/128 |
| 5,454,172 A | 10/1995 | Crigger | |
| 5,511,323 A * | 4/1996 | Dahlgren | 36/3 A |
| 5,647,150 A * | 7/1997 | Romanato et al. | 36/117.1 |
| 5,709,763 A | 1/1998 | Nakanishi et al. | |
| 5,737,858 A | 4/1998 | Levy | |
| 5,853,854 A | 12/1998 | Nakanishi et al. | |
| 6,032,388 A | 3/2000 | Fram | |
| 6,233,845 B1 * | 5/2001 | Belli | 36/3 A |
| 6,401,364 B1 | 6/2002 | Burt | |

(Continued)

FOREIGN PATENT DOCUMENTS

DE    17 36 512    12/1956

(Continued)

OTHER PUBLICATIONS

Communication Relating to the International Search Report and The Written Opinion of the International Searching Authority in corresponding PCT application, application No. PCT/US2004/017435, mailed Mar. 2, 2005.

(Continued)

*Primary Examiner*—Marie Patterson
(74) *Attorney, Agent, or Firm*—Banner & Witcoff, Ltd.

(57) ABSTRACT

A article of footwear having an upper and a sole structure secured to the upper. At least a portion of the upper includes a substrate layer and a polymer layer. The substrate layer is formed of an air-permeable material, and may be a textile or mesh material. The polymer layer defines a plurality of apertures that expose portions of the substrate layer, and the polymer layer is formed of a polymer material that infiltrates the substrate layer and is thereby secured to the substrate layer. A method of forming the material for the upper includes casting a polymer resin to form the polymer layer.

14 Claims, 9 Drawing Sheets

U.S. PATENT DOCUMENTS

2002/0078599 A1    6/2002   Delgorgue et al.

FOREIGN PATENT DOCUMENTS

| EP | 0 577 307 | 9/1999 |
|----|-----------|--------|
| EP | 1340438 | 9/2003 |
| JP | 01-301601 | 12/1989 |
| JP | 01-310601 | 12/1989 |
| JP | 03-106304 | 5/1991 |
| JP | 04-276204 | 10/1992 |
| JP | 04-357902 | 12/1992 |
| JP | 05-064840 | 3/1993 |
| JP | 06-000826 | 1/1994 |
| JP | 06-166038 | 6/1994 |
| JP | 06-169802 | 6/1994 |
| JP | 06-246758 | 9/1994 |
| JP | 06-296502 | 10/1994 |
| JP | 07-000205 | 1/1995 |
| JP | 07-310273 | 11/1995 |
| JP | 08-052007 | 2/1996 |
| JP | 08-090650 | 4/1996 |
| JP | 09-028412 | 2/1997 |
| JP | 10-248605 | 9/1998 |
| JP | 11-225803 | 8/1999 |
| WO | WO 95/24305 | 9/1995 |

OTHER PUBLICATIONS

Communication Relating to the Results of the Partial International Search in corresponding PCT application, application No. PCT/US2004/017435, mailed Dec. 9, 2004.

* cited by examiner

ARTICLE OF FOOTWEAR HAVING AN UPPER WITH A POLYMER LAYER

BACKGROUND OF THE INVENTION

1. Field of the Invention

The present invention relates to footwear and concerns, more particularly, an upper for an article of footwear that incorporates a polymer layer having a web configuration.

2. Description of Background Art

Conventional articles of athletic footwear generally include two primary elements, an upper and a sole structure. The upper is secured to the sole structure and forms a void on the interior of the footwear for comfortably and securely receiving a foot. The sole structure is positioned between the foot and the ground to attenuate ground reaction forces and absorb energy as the footwear contacts the ground. Accordingly, the upper and sole structure operate in concert to position the foot relative to the ground and to protect the foot.

The upper generally extends over the instep and toe areas of the foot, along the medial and lateral sides of the foot, and around the heel area of the foot. Access to the void on the interior of the footwear is generally provided by an ankle opening. A lacing system is often incorporated into the upper to selectively increase the size of the ankle opening and permit the wearer to modify certain dimensions of the upper, particularly girth, to accommodate feet with varying dimensions. In addition, the upper may include a tongue that extends under the lacing system to enhance the comfort of the footwear, and the upper may incorporate a heel counter to limit movement of the heel.

Various materials are conventionally utilized in manufacturing the upper. The upper of athletic footwear, for example, may be formed from multiple material layers that include an first layer, a middle layer, and an interior layer. The materials forming the first layer of the upper may be selected based upon the properties of wear-resistance, flexibility, and air-permeability, for example. With regard to the first layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability. Accordingly, various other areas of the first layer of the upper may be formed from a synthetic textile. The first layer of the upper may be formed, therefore, from numerous material elements that each impart different properties to the upper. A middle layer of the upper may be formed from a lightweight polymer foam material that provides cushioning and protects the foot from objects that may contact the upper. Similarly, an interior layer of the upper may be formed of a moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

Based upon the above discussion, the conventional upper is formed from multiple layers, and each layer may be formed from multiple material elements that impart different properties to the upper. In manufacturing the upper, the specific materials utilized for each layer and element are selected and then cut to a predetermined shape. Considerable effort is then expended in joining the various elements together, particularly the various material elements forming the first layer of the upper.

SUMMARY OF THE INVENTION

The present invention is an article of footwear having an upper and a sole structure secured to the upper. At least a portion of the upper includes a substrate layer and a polymer layer. The substrate layer is formed of an air-permeable material. The polymer layer defines a plurality of apertures that expose portions of the substrate layer, and the polymer layer is formed of a polymer material that infiltrates the substrate layer and is thereby secured to the substrate layer.

The substrate layer may be formed of a textile having the configuration of a mesh material, for example. The substrate layer may also be a mesh material that includes two spaced textile layers interconnected by a plurality of connecting fibers. The polymer layer may be formed of a polymer material, such as a thermoset polyurethane, and the polymer layer may be formed through a casting process that includes placing a polymer resin into a mold such that the polymer resin infiltrates the substrate layer.

The polymer layer may be incorporated into the footwear in order to form an exterior surface of the upper. More particularly, the polymer layer may form at least a portion of a toe region of the upper and may also form at least a portion of a lateral region of the upper. In some embodiments, the polymer layer has a stepped configuration that forms a plurality of ridges positioned on the exterior surface.

Another aspect of the invention involves a method of manufacturing an article of footwear. The method involves a step of casting a polymer resin to form a polymer layer that defines a plurality of apertures. The method also involves a step of infiltrating a substrate layer with a portion of the polymer resin to secure the polymer layer to the substrate layer, portions of the substrate layer being exposed though the apertures. The polymer layer and the substrate layer may then be incorporated into the article of footwear.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose an article of footwear having an upper in accordance with the present invention. The footwear, and particularly the upper, is discussed in the following material as being suitable for athletic activities that include skateboarding. The concepts disclosed with respect to the upper, however, may be applied to footwear that is specifically designed for a wide range of other athletic activities, including running, walking, basketball, baseball, football, soccer, and hiking, for example, and may also be applied to various non-athletic footwear styles. Accordingly, one skilled in the relevant art will recognize that the concepts disclosed herein may be applied to a wide range of footwear styles and are not limited to the specific embodiments discussed below and depicted in the figures.

Figure 1:
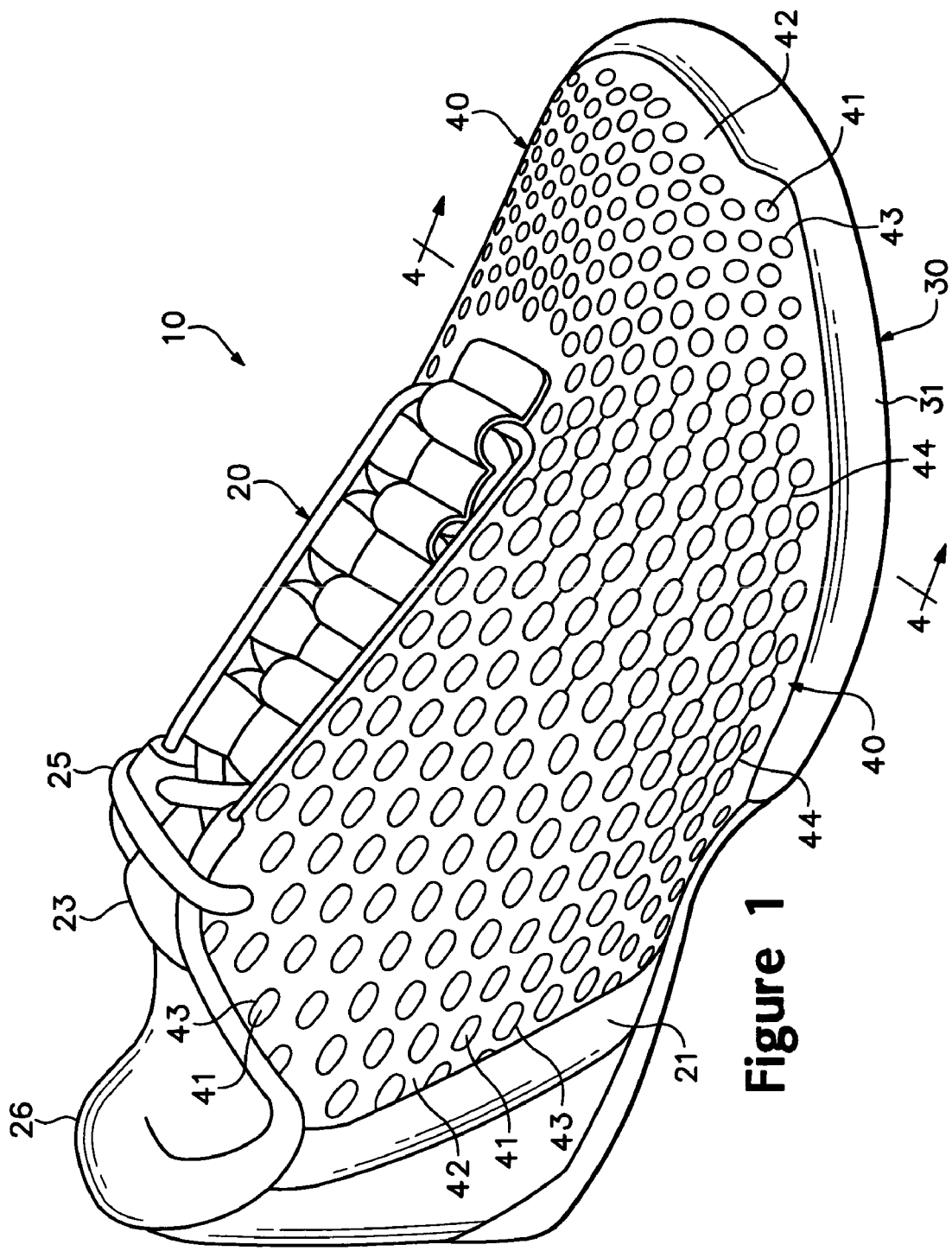
FIG. 1 is a perspective view of an article of footwear having an upper in accordance with the present invention.
Figure 2:
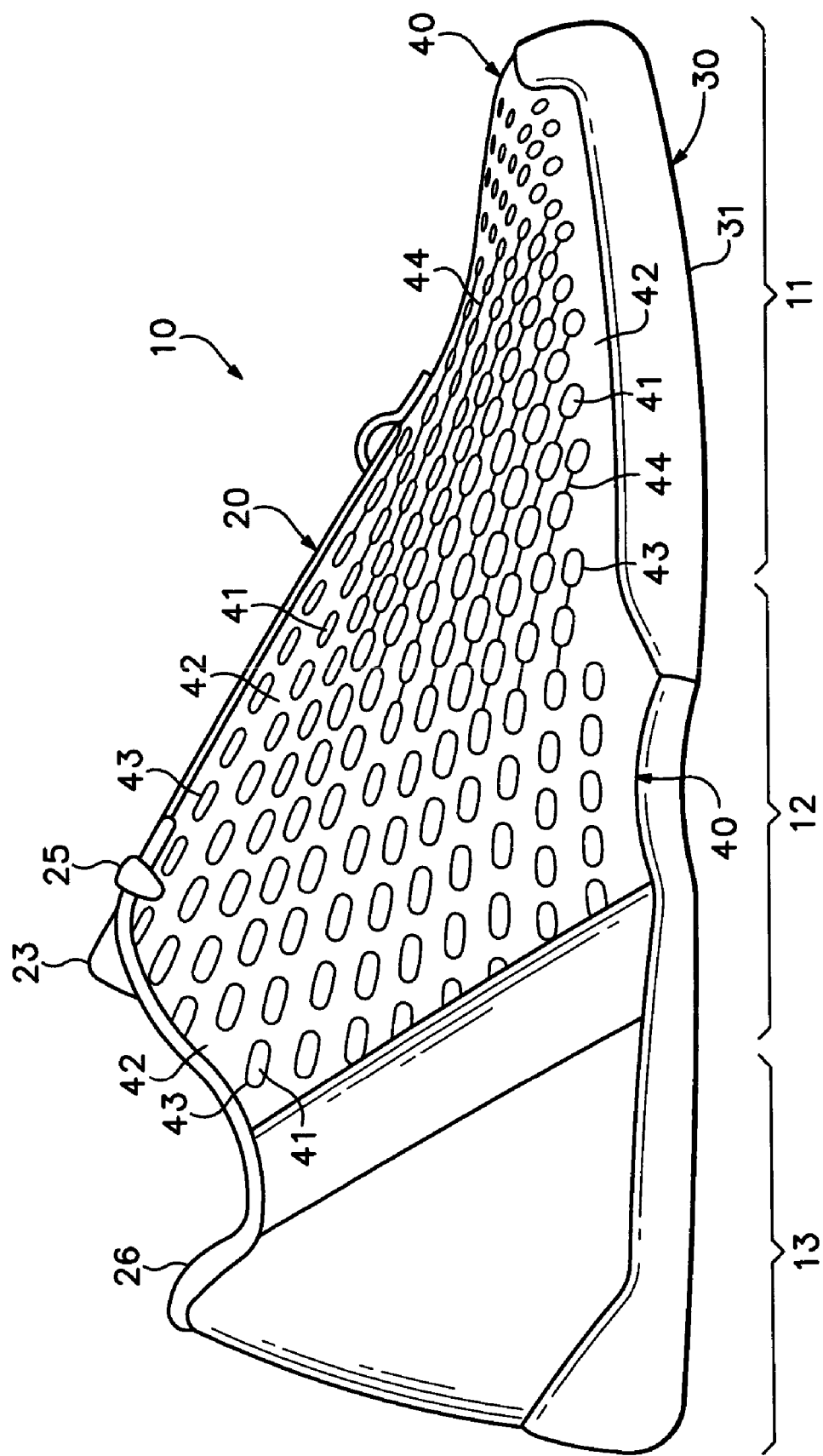
FIG. 2 is a lateral elevational view of the article of footwear.
Figure 3:
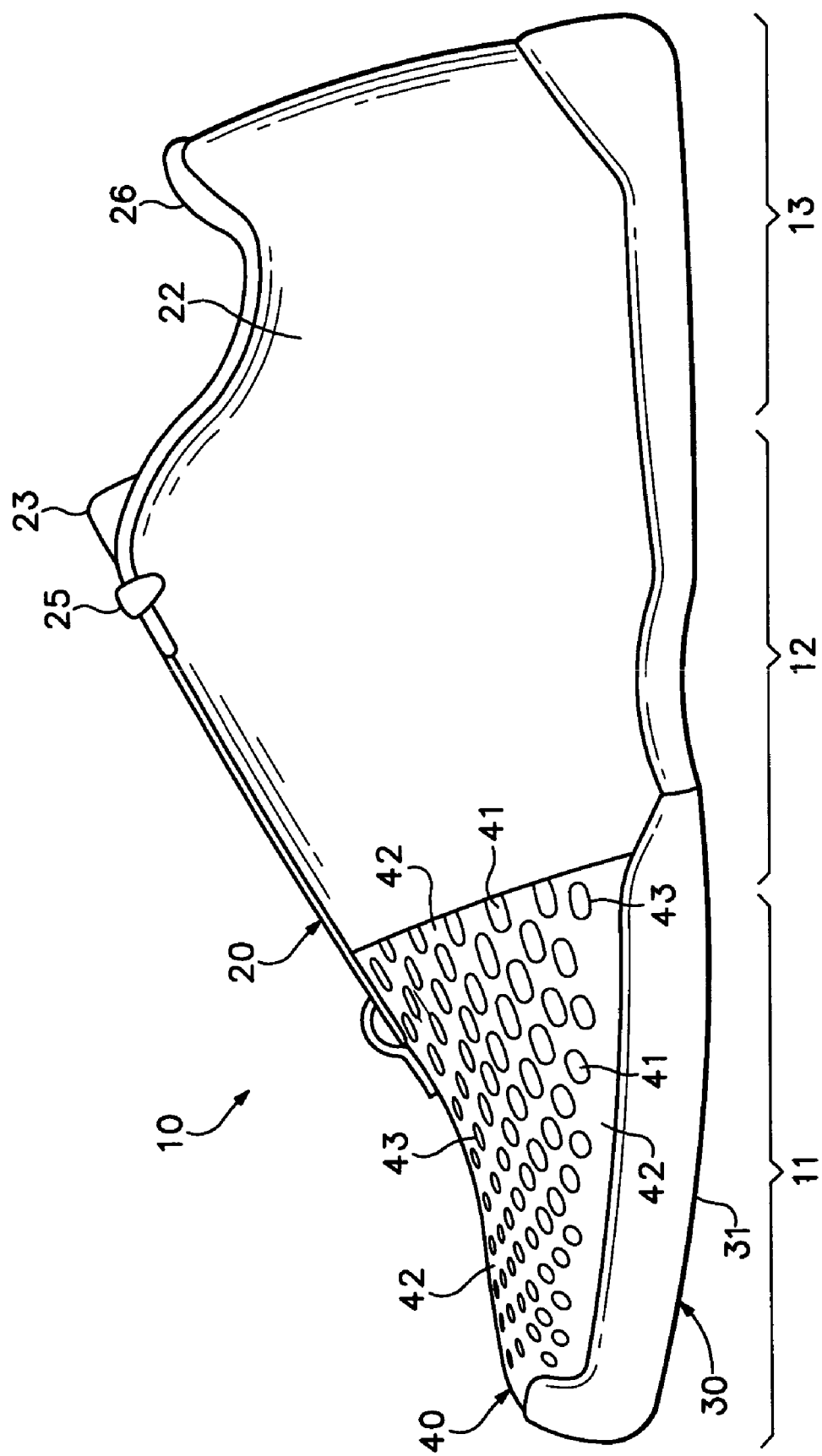
FIG. 3 is a medial elevational view of the article of footwear.

An article of footwear 10 having an upper 20 and a sole structure 30 is depicted in FIGS. 1–3. Upper 20 is formed of various material elements that are stitched or adhesively-bonded together to form an interior void that comfortably receives a foot and secures the position of the foot relative to sole structure 30. Sole structure 30 is secured to a lower portion of upper 20 and provides a durable, wear-resistant component for attenuating ground reaction forces and absorbing energy (i.e., providing cushioning) as footwear 10 impacts the ground.

For purposes of reference, footwear 10 may be divided into three general regions: a forefoot region 11, a midfoot region 12, and a heel region 13, as defined in FIG. 1. Regions 11–13 are not intended to demarcate precise areas of footwear 10. Rather, regions 11–13 are intended to represent general areas of footwear 10 that provide a frame of reference during the following discussion. Although regions 11–13 apply generally to footwear 10, references to regions 11–13 may also apply specifically to upper 20, sole structure 30, or an individual component within either upper 20 or sole structure 30.

The various material elements forming upper 20, which will be described in greater detail below, combine to provide a structure having a lateral side 21, an opposite medial side 22, a tongue 23, and a lasting sock 24 that form the void within upper 20. Lateral side 21 extends through each of regions 11–13 and is generally configured to contact and cover a lateral surface of the foot. A portion of lateral side 21 extends over an instep of the foot and overlaps a lateral side of tongue 23. Medial side 22 has a similar configuration that generally corresponds with a medial surface of the foot. A portion of medial side 22 also extends over the instep of the foot and overlaps an opposite medial side of tongue 23.

Tongue 23 extends longitudinally along upper 20 and is positioned to contact the instep area of the foot. Side portions of tongue 23 are secured to an interior surface of each of lateral side 21 and medial side 22. A lace 25 extends over tongue 23 and through apertures formed in lateral side 21 and medial side 22. Tongue 23 extends under lace 25 to separate lace 25 from the instep area of the foot. By increasing the tension in lace 25, the tension in lateral side 21 and medial side 22 may be increased so as to draw lateral side 21 and medial side 22 into contact with the foot. Similarly, by decreasing the tension in lace 25, the tension in lateral side 21 and medial side 22 may be decreased so as to provide additional volume within upper 20 for the foot. This general configuration provides, therefore, a mechanism for adjusting the fit of upper 20 and accommodating various foot dimensions.

The portion of upper 20 in forefoot region 11 has a configuration that extends over a fore portion of the foot, including the toes. A portion of sole structure 30 may extend onto the sides of upper 20 in forefoot region 11 to impart wear-resistance, thereby preventing excess abrasion as forefoot region 11 contacts concrete, rocks, trees, or other abrasive surfaces.

The portion of upper 20 in heel region 13 is configured to extend around the heel of the foot and may incorporate a conventional heel counter formed of a semi-rigid polymer material, for example, to ensure that the heel remains properly positioned with respect to upper 20. The heel counter may be located on an exterior of upper 20 or within the various material elements forming upper 20. The portion of upper 20 in heel region 13 also has a configuration that defines an ankle opening 26 for providing the foot with access to the void within upper 20.

In manufacturing footwear 10, the various elements of upper 20 are assembled around a last that imparts the general shape of a foot to the void within upper 20. That is, the various elements are assembled around the last to form lateral side 21 and medial side 22 of upper 20, which extend from forefoot region 11 to heel region 13. In addition, the instep area is formed to include tongue 23 and lace 25, for example, and ankle opening 26 is formed in heel region 13 to provide the foot with access to the void within upper 20. Lasting sock 24 is also secured to lateral side 21 and medial side 22 and extends under the last to form a lower surface of the void within upper 20. A portion of sole structure 30 is then permanently secured to a lower area of upper 20, which includes lasting sock 26. In joining upper 20 and sole structure 30, adhesives, stitching, or a combination of adhesives and stitching may be utilized. In this manner, upper 20 is secured to sole structure 30 through a substantially conventional process.

Sole structure 30 includes an outsole 31 and a foot-supporting member 32. Outsole 31 is secured to the lower area of upper 20 and is positioned to engage the ground during walking, running, or other ambulatory activities. The materials forming outsole 31 may include a rubber compound that enhances the durability of footwear 10 by providing a relatively high degree of wear-resistance. Portions of outsole 31 may extend upward and onto the sides of upper 20, particularly in the forefoot region and the heel region of footwear 10.

Foot-supporting member 32 is removably-located within the void formed by upper 20, and is positioned to contact a plantar surface of the foot. The lower surface of foot-supporting member 32 has a shape that interfaces with the interior of upper 20. The upper surface of foot-supporting member 32 may be contoured to generally conform with the shape of the plantar surface of the foot, thereby providing support and enhancing the comfort of footwear 10. Foot-supporting member 32 may be formed from a polymer foam, such as polyurethane or ethylvinylacetate, that attenuates ground reaction forces and absorbs energy, and foot-supporting member 32 may have a textile material 33 adhesively-secured to the upper surface. In addition, foot-supporting member 32 may incorporate a fluid-filled bladder 34 having the general configuration disclosed in U.S. Pat. No. 4,183,156 to Rudy. Fluid-filled bladder 34 may be located solely within the heel region of sole structure 30 or may extend through a substantial portion of foot-supporting member 32. Fluid-filled bladder 34 may also have the general configuration disclosed in U.S. Pat. Nos. 4,906,502 and 5,083,361, both to Rudy, in which a hermetically sealed upper and lower barrier layers are securely bonded over a double-walled fabric core that limits outward movement of the barrier layers to a desired distance.

In the configuration of sole structure 30 discussed above, foot-supporting member 32 is the primary component that imparts cushioning. Foot-supporting member 32 is analogous, therefore, to the midsole of some conventional types of footwear. In a further embodiment, footwear 10 may include a midsole formed of a polymer foam material, and outsole 31 may be secured to a lower surface of the midsole. In addition, a conventional insole or sockliner may be positioned in the void within upper 20. Footwear 10 may also be structured such that outsole 31 contacts lasting sock 24. Alternately, a layer of polymer foam material, such as polyurethane or ethylvinylacetate, may be positioned between at least a portion of outsole 31 and lasting sock 24, and a fluid-filled bladder may be incorporated into the polymer foam material. Accordingly, sole structure 30 may have a variety of configurations within the scope of the present invention.

The portions of upper 20 corresponding with lateral side 21 and medial side 22 are formed from a variety of materials. With respect to the specific embodiment depicted in FIGS. 1–3, the materials forming heel region 13 may include various layers of conventional upper materials, including leather, synthetic leather, rubber, polymer foam, and various textiles, for example. Such materials may be combined such that an exterior layer of heel region 13 is formed of the leather, synthetic leather, or rubber materials to provide durability and wear-resistance. A middle layer of upper 20 may be formed from the polymer foam to impart comfort, and an interior layer of upper 20 may be formed from one of many textiles. In contrast with the conventional materials forming heel region 13, a material 40 is incorporated into the portions of lateral side 21 corresponding with forefoot region 11 and midfoot region 12, and material 40 is incorporated into the portions of medial side 22 corresponding with forefoot region 11. The specific locations of the conventional materials and material 40 may vary significantly within the scope of the present invention. For example, material 40 may extend through all of regions 11–13, material 40 may be limited to one of heel region 13 or forefoot region 11, or material 40 may be located in the portions of upper 20 that are immediately adjacent to sole structure 30. One skilled in the relevant art will recognize, therefore, that the specific location of material 40 may vary depending upon the style of the footwear and the intended activities for which the footwear is designed, for example.

Figure 4:
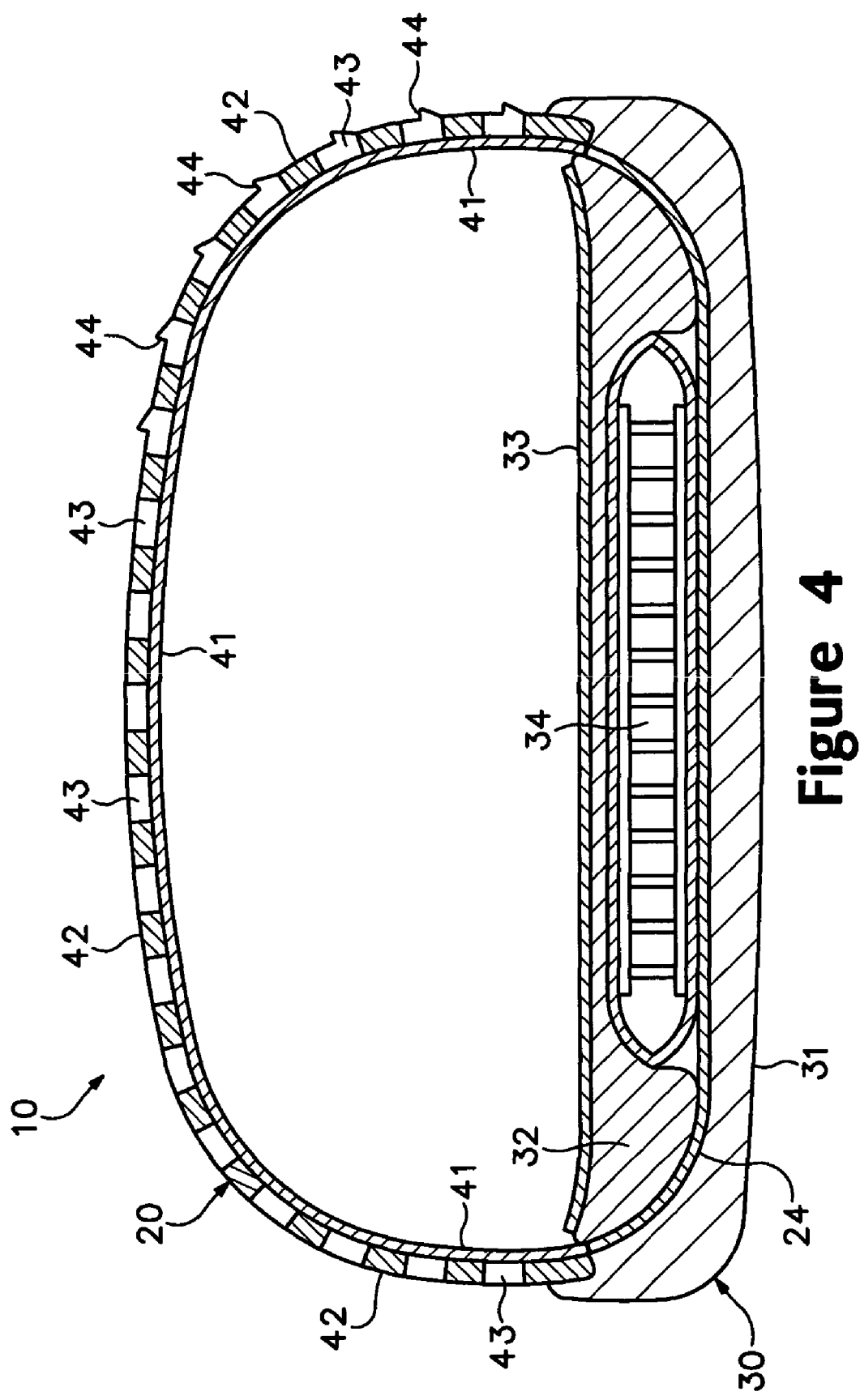
FIG. 4 is a cross-sectional view of the article of footwear, as defined by section line 4—4 in FIG. 1.

Material 40 is depicted in the figures as forming an exterior surface of portions of upper 20. A foam middle layer and a textile inner layer, or some combination thereof, may be utilized for portions of upper 20 that incorporate material 40. As depicted in FIG. 4, however, material 40 generally forms the entire thickness of upper 20 in areas where material 40 is present. Material 40 may also be incorporated into upper 40 such that a different layer of material forms the exterior of upper 20. Accordingly, the placement of material 40 with respect to the thickness of upper 40 may also vary within the scope of the present invention.

Material 40 includes a substrate layer 41 and a polymer layer 42. As will be described in greater detail below, material 40 is formed through a process that involves casting polymer layer 42 and then placing substrate layer 41 in contact with the polymer resin that forms polymer layer 42. The polymer resin then infiltrates substrate layer 41 and cures, thereby securing polymer layer 42 to substrate layer 41. Substrate layer 41 may be any textile material within the scope of the present invention, and may be a woven or non-woven textile, for example, formed of synthetic, natural, or a combination of synthetic or natural materials. That is, the fibers and/or filaments forming the textile material of substrate layer 41 may be formed from a variety of materials.

Many textile materials are permeable and permit air or other fluids to pass through the fiber structure. In footwear applications, air-permeability of the upper is utilized to ventilate the interior of the upper, thereby removing perspiration and warm air from the void within the upper. The textile material forming substrate layer 41 may also be air-permeable, and substrate layer 41 may be formed of a mesh material that further facilitates air-permeability. In general, the mesh material has a woven, knit, or knotted structure with a plurality of spaced openings that enhance the air-permeable structure of substrate layer 41. The mesh material may also be a spacer mesh material that includes two mesh material layers spaced apart and interconnected with a plurality of connecting fibers. Substrate layer 41 may be formed, therefore, of multiple mesh material layers that are connected together with the connecting fibers. In addition to enhanced air-permeability, the spacer mesh material also provides a compressible structure that imparts impact protection and generally enhances the comfort of upper 20.

Polymer layer 42 is formed from a polymer material through a casting process. During the casting process, the polymer resin infiltrates substrate layer 41, thereby extending around the various filaments and fibers that form substrate layer 41. Upon curing, the polymer material forming polymer layer 42 is effectively secured to substrate layer 41. Suitable polymer materials for substrate layer 41 include a variety of thermoplastic and thermoset polymer formulations, such as polyurethane, polyvinylchloride, rubber, polyethylene, and nylon, for example. More specifically, a suitable material for polymer layer 42 is a thermoset polyurethane provided by Dong Sung Chemical Company of Korea under the Neocast 4180 tradename. This thermoset polyurethane exhibits greater wear-resistance and moldability than conventional polyurethane due to the presence of a polyester polyol, instead of polyether and polytetramethylene polyol. In addition, this thermoset polyurethane exhibits an akron abrasion of 0.05, whereas conventional polyurethane exhibits an akron abrasion in a range of 0.1 to 0.5.

A plurality of apertures 43 are defined in polymer layer 42 and impart the general configuration of a web to polymer layer 42. As depicted in the figures, the shape of apertures 43 vary from generally circular to elliptical. Apertures 43 with the circular configuration are concentrated in forefoot region 11, and apertures 43 tend to become increasingly elliptical in rear areas of forefoot region 11 and midfoot region 12. Accordingly, apertures 43 exhibit a spectrum of shapes that ranges from circular to elliptical. In further embodiments of the invention, apertures 43 may have a variety of other geometric shapes, including triangular, square, pentagonal, and hexagonal, for example, and apertures 43 may have a variety of non-geometric shapes.

Apertures 43 are arranged to form of a plurality of interconnected segments in polymer layer 42. That is, the polymer material forming a substantial portion of polymer layer 43 has the configuration of a web, with apertures 43 forming the spaces within the web. The plurality of apertures 43 impart three primary advantages to upper 20. First, apertures 43 enhance the flexibility of polymer layer 42, thereby enhancing the overall flexibility of upper 20. Second, apertures 43 reduce the overall weight of footwear 10 and reduce the amount of polymer resin utilized to form material 40. Third, apertures 43 expose portions of substrate layer 41 to enhance the air-permeability of upper 20. As discussed above, substrate layer 41 is a textile material with the benefit of air-permeability. Apertures 43, therefore, form areas of material 40 where air or water vapor may pass through substrate layer 41. Although the polymer resin infiltrates substrate layer 41 to secure polymer layer 42 to substrate layer 41, the polymer material is absent from areas of substrate layer 41 that correspond with positions of apertures 43 to further facilitate air-permeability.

Footwear 10 has a configuration that is suitable for activities involving skateboarding. During skateboarding activities, individuals may utilize footwear 10 as a means to reduce the velocity of the skateboard. That is, individuals may drag footwear 10 along the ground to slow the skateboard. In this manner, footwear 10 may experiences significant wear due to the abrasive and frictional forces that act upon footwear 10 while in contact with the ground. The thickness of polymer layer 42 may vary to compensate for the wear that occurs during skateboarding activities. For example, the thickness of polymer layer 42 in forefoot region 11 may be greater than the thickness in midfoot region 12. Similarly, the thickness of polymer layer 42 in areas that are adjacent to outsole 31 may be greater than the thickness in areas adjacent tongue 23. The rationale for the varying thickness may relate to the relative degrees of wear in each area. Portions of upper 20 in forefoot region 11 generally experience more wear than portions in midfoot region 12. Similarly, portions of upper 20 adjacent outsole 31 generally experience more wear than portions adjacent tongue 23. Accordingly, the thickness of polymer layer 42 varies to compensate for the uneven wear distribution in upper 20.

Individuals may also utilize footwear 10 as a means to manipulate the skateboard. That is, the individual may utilize upper 20 to contact the skateboard and move the skateboard to a desired position or orientation. In order to facilitate manipulation of the skateboard with footwear 10, a plurality of ridges 44 may be formed in the exterior of polymer layer 42. Ridges 44 are depicted in the figures as extending between adjacent apertures 43, and ridges 44 impart a stepped configuration to the portion of polymer layer 42 that is on lateral side 21 and extends between forefoot region 11 and midfoot region 12. The stepped configuration formed by ridges 44 form discontinuities in the surface of polymer layer 42 that may catch upon the skateboard and assist with moving or positioning the skateboard.

Figure 5:
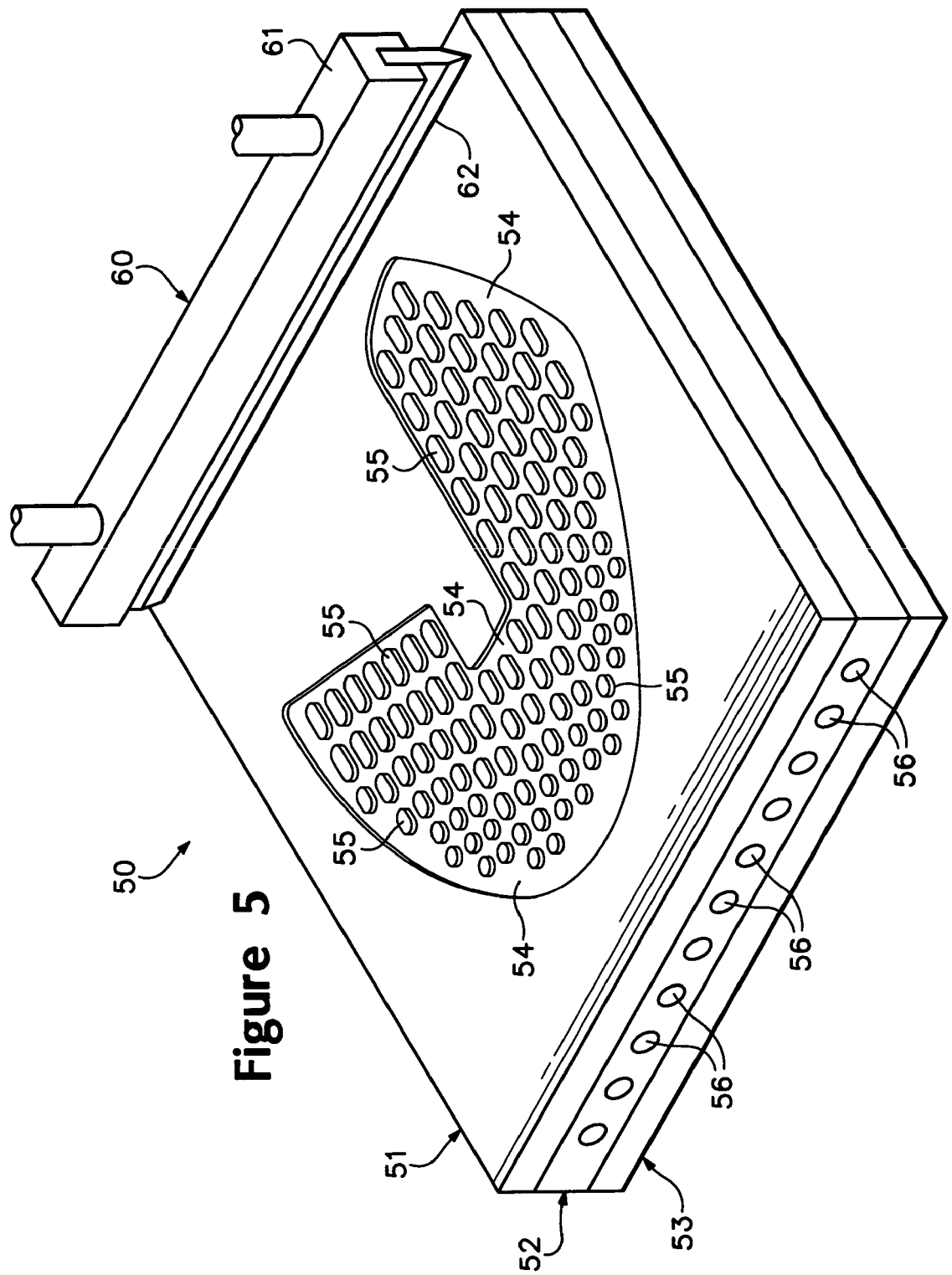
FIG. 5 is a first schematic perspective view of a portion of a molding apparatus for forming a material of the upper.

The manufacturing process for material 40 will now be discussed in detail. FIG. 5 depicts a molding apparatus 50 having a mold plate 51, a heating plate 52, and a thermal insulating material 53 arranged in a layered relationship. Mold plate 51 includes a cavity 54 having the general shape of polymer layer 42, and a plurality of projections 55, which form apertures 43, extend upward from a lower surface of cavity 54. Heating plate 52 includes a plurality of parallel cartridge heaters 56 that extend through the length of heating plate 52 and supply heat to mold plate 51. Thermal insulating material 53 provides thermal insulation for a lower surface of heating plate 52, thereby directing energy from cartridge heaters 56 to mold plate 51. Molding apparatus 50 also includes a blade apparatus 60 having a blade holder 61 and a blade 62.

Figure 6:
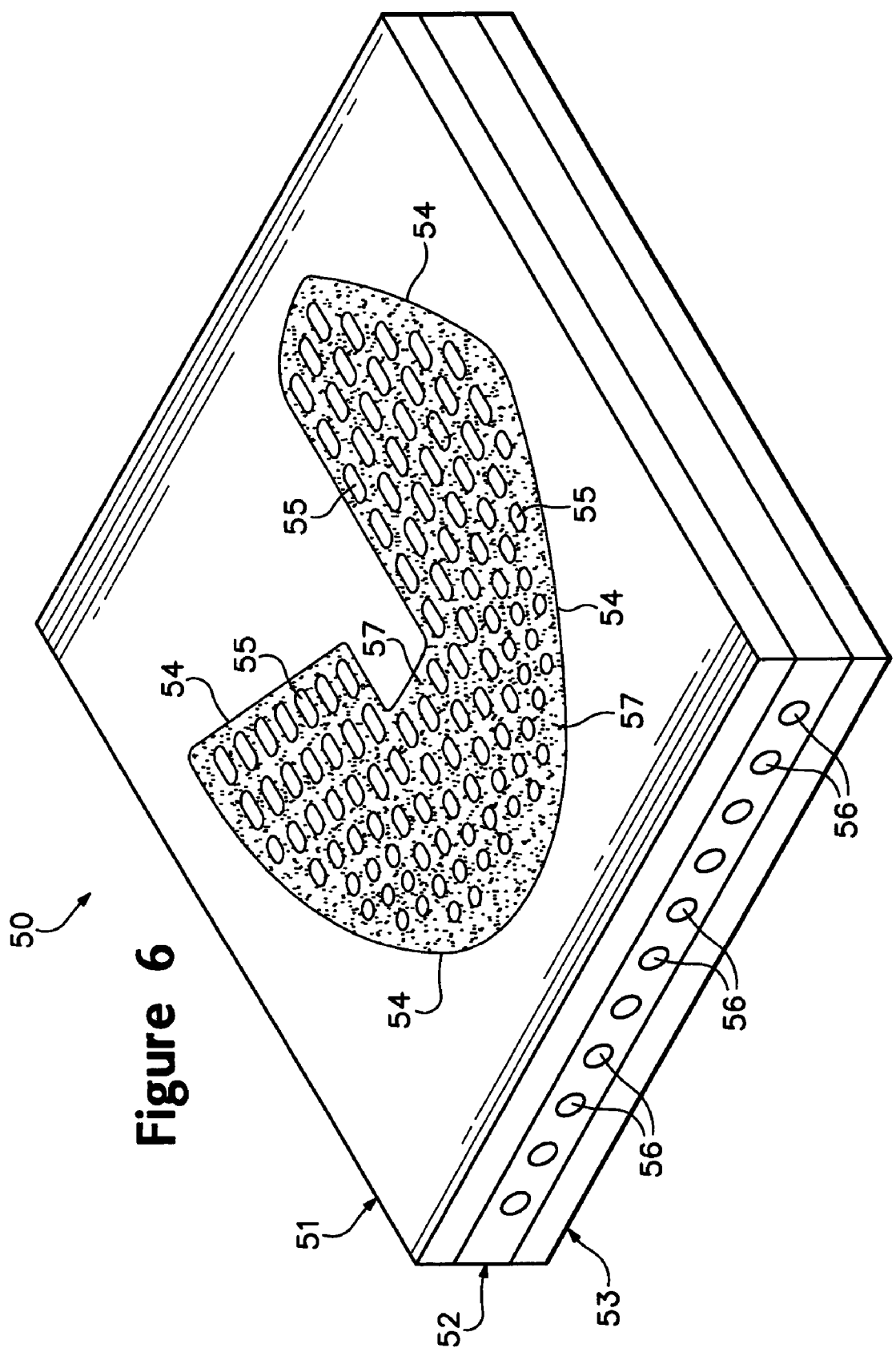
FIG. 6 is a second schematic perspective view of the molding apparatus, which includes a polymer resin within a mold cavity.

The manner in which each of the components from molding apparatus 50 are utilized in manufacturing material 40 will now be discussed. Initially, cavity 54 is empty and a pouring apparatus is utilized to place a measured volume of a polymer resin 57, which becomes polymer layer 42, into cavity 54. The volume of polymer resin 57 delivered to cavity 54 may be approximately equal to the volume of cavity 54, but may also vary depending upon the specific application. Mold plate 51 is then placed within a vibration and vacuum unit to initially distribute polymer resin 57 throughout cavity 54 and remove air that may be trapped within polymer resin 57. Blade apparatus 60 is then utilized to further distribute polymer resin 57 throughout cavity 54, thereby uniformly spreading the polymer resin to all portions of cavity 54. More specifically, blade 62 contacts the upper surface of mold plate 51 and moves across the upper surface of cavity 54 to distribute polymer resin 57. At this stage, polymer resin 57 is uniformly distributed within cavity 54 and an upper surface of polymer resin 57 is coplanar with the upper surface of cavity 54, as depicted in FIG. 6.

Figure 7:
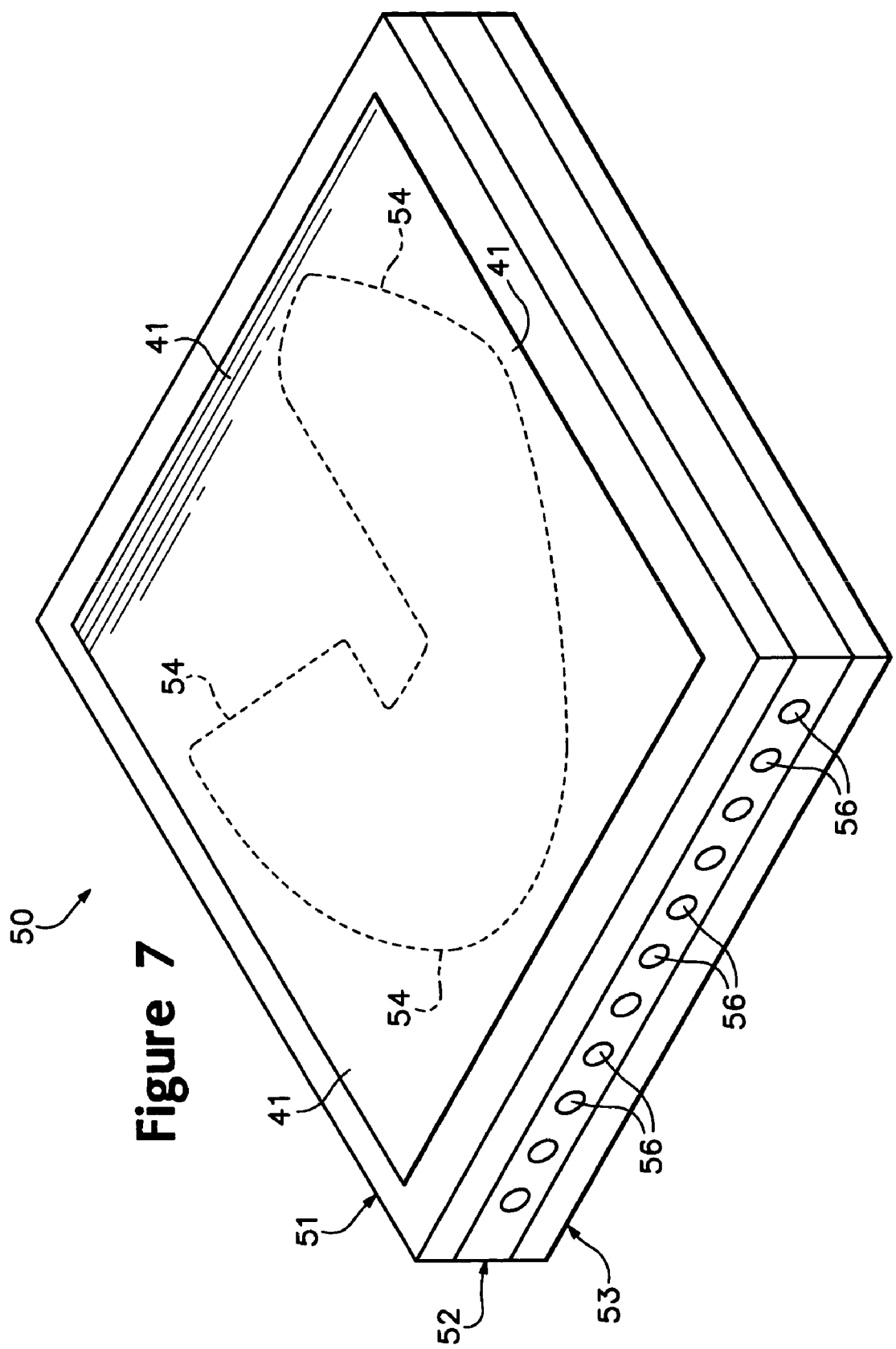
FIG. 7 is a third schematic perspective view of the molding apparatus, which includes a substrate layer adjacent to the polymer resin.
Figure 8:
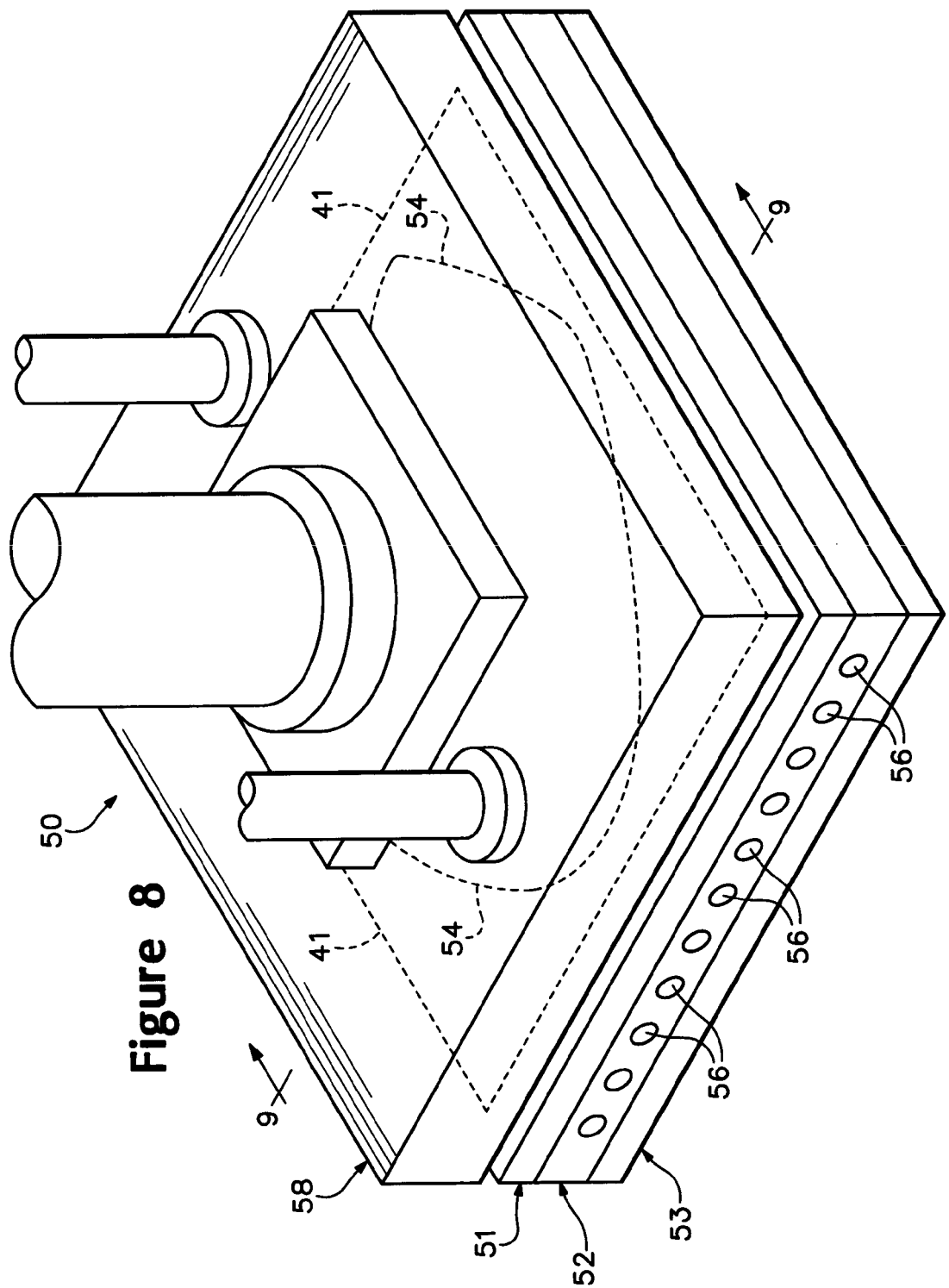
FIG. 8 is a fourth schematic perspective view of the molding apparatus, which includes a pressing plate in contact with the substrate layer.
Figure 9:
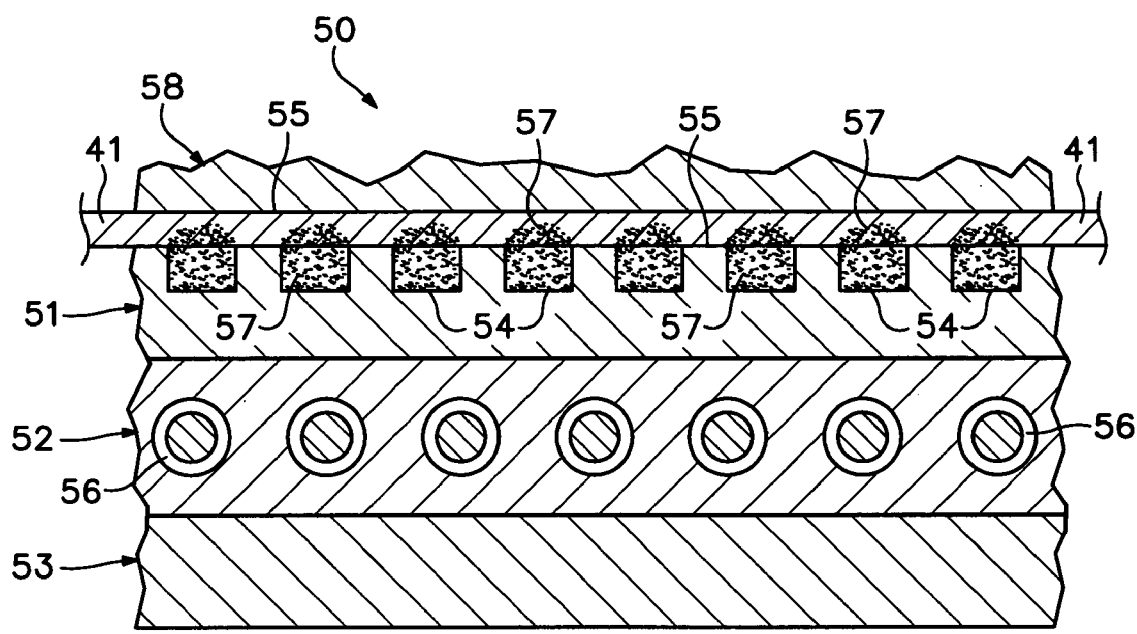
FIG. 9 is a partial schematic cross-sectional view of the molding apparatus, as defined by section line 9—9 in FIG. 8.

Following the distribution of polymer resin 57 throughout cavity 54, substrate layer 41 is placed into contact with polymer resin 57. As depicted in FIG. 7, substrate layer 41 rests upon the upper surface of mold plate 51 and the upper surface of polymer resin 57. A pressing plate 58 is then utilized to compress substrate layer 41 into polymer resin 57, as depicted in FIG. 8. The pressure supplied by pressing plate 58 induces a portion of polymer resin 57 to infiltrate substrate layer 41, which may be a textile. Accordingly, polymer resin 57 extends around the various filaments and fibers that form substrate layer 41, as depicted in the cross-section of FIG. 9.

Specific areas of substrate layer 41 contact the upper surface of projections 55 and are compressed against the upper surface of projections 55 by pressing plate 58. Whereas polymer resin 57 infiltrates much of substrate layer 41, polymer resin 57 does not generally extend into the areas of substrate layer 41 that contact the upper surface of projections 55. As discussed above, the polymer material forming polymer layer 42 is absent from areas of substrate layer 41 that correspond with positions of apertures 43 to facilitate air-permeability. By compressing substrate layer 41 against the upper surface of projections 55, polymer resin 57 is precluded from entering the areas of substrate layer 41 that correspond with positions of apertures 43.

Figure 10:
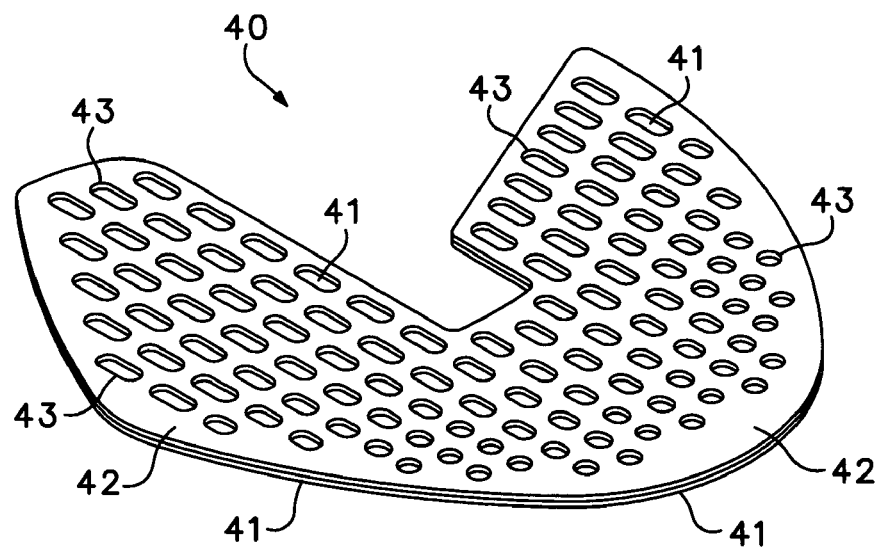
FIG. 10 is a schematic perspective view of the material formed with the mold.

Heating plate 52 then supplies heat to polymer resin 57, which cures polymer resin 57 and effectively forms polymer layer 42. Heat may also be supplied from pressing plate 58. The curing of polymer resin 57 also secures substrate layer 41 to polymer layer 42. Material 40, which includes substrate layer 41 and polymer layer 42, may then be removed from cavity 54, as depicted in FIG. 10, and incorporated into upper 20 to form footwear 10.

The manufacturing process disclosed above may be automated to enhance the efficiency of producing material 40. Accordingly, each of the various steps in the process may be performed at discrete stations around a conveyor. For example, the stations may include a pouring station for introducing polymer resin 57 into cavity 54, a vibration and vacuum station, a charging station, and a pressing station. Further automation may be utilized to clean excess polymer resin 57 from blade 62. For example, compressed air may remove the excess polymer resin 57, which does not involve the solvents or other chemicals.

Injection molding processes inject polymer resin at relatively high pressures and require a closed mold. A benefit of the casting process described above is that an open mold may be utilized, which is less expensive to produce and operate. The high pressures utilized in injection molding may also limit the ability to preclude polymer resin 57 from entering the areas of substrate layer 41 that correspond with positions of apertures 43. By limiting the polymer resin from entering the areas of substrate layer 41 that correspond with positions of apertures 43, however, a high degree of air-permeability is retained in material 40.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An article of footwear having an upper and a sole structure secured to the upper, at least a portion of the upper comprising:
   a substrate layer formed of an air-permeable textile material; and
   a web layer defining a plurality of apertures that expose portions of the textile material of the substrate layer, the web layer being formed of a polymer material that infiltrates the textile material of the substrate layer and is thereby secured to the substrate layer, and the web layer forming an exterior surface of the upper to have a stepped configuration tat forms a plurality of ridges positioned on the exterior surface, the ridges extending between adjacent apertures.

2. The article of footwear recited in claim 1, wherein the textile material of the substrate layer is a non-woven.

3. The article of footwear recited in claim 1, wherein the textile material of the substrate layer is a mesh material.

4. The article of footwear recited in claim 3, wherein the mesh material includes two spaced textile layers interconnected by a plurality of connecting fibers.

5. The article of footwear recited in claim 1, wherein the web layer forms at least a portion of an exterior surface of the upper.

6. The article of footwear recited in claim 5, wherein the web layer forms at least a portion of a toe region of the upper.

7. The article of footwear recited in claim 6, wherein at least a portion of the ridges are positioned in the toe region of the footwear.

8. The article of footwear recited in claim 5, wherein the web layer forms at least a portion of a lateral region of the upper.

9. The article of footwear recited in claim 8, wherein at least a portion of the ridges are positioned in the lateral region of the footwear.

10. The article of footwear recited in claim 1, wherein the textile material is at least partially formed from a plurality of filaments or fibers, and the polymer material of the web layer extends around the plurality of filaments or fibers to secure the web layer to the substrate layer.

11. The article of footwear recited in claim 1, wherein the polymer material of the web layer is a thermoset polyurethane material.

12. The article of footwear recited in claim 1, wherein the web layer is formed through a casting process.

13. The article of footwear recited in claim 12, wherein the casting process includes placing a polymer resin into a mold such that the polymer resin infiltrates the substrate layer.

14. The article of footwear recited in claim 1, wherein the polymer material is absent from areas of the substrate layer that correspond with positions of the apertures.

* * * * *